United States Patent [19]

Sticht

[11] Patent Number: 4,530,287
[45] Date of Patent: Jul. 23, 1985

[54] CONVEYOR ARRANGEMENT
[75] Inventor: Walter Sticht, Attnang, Austria
[73] Assignee: Stiwa-Fertigungstechnik Sticht Gesellschaft m.b.H., Attnang/Pucheim, Austria
[21] Appl. No.: 679,619
[22] Filed: Dec. 10, 1984

Related U.S. Application Data

[63] Continuation of Ser. No. 470,917, Mar. 1, 1983, abandoned.

[30] Foreign Application Priority Data

Mar. 5, 1982 [AT] Austria .................................. 867/82

[51] Int. Cl.³ ...................... B61B 13/00; B65G 35/08
[52] U.S. Cl. .................................. 104/168; 104/247; 198/472; 198/722
[58] Field of Search ............... 104/134, 165, 168, 247; 198/345, 472, 624, 722

[56] References Cited

U.S. PATENT DOCUMENTS 3,610,391 10/1971 Beck .................. 198/722 X
4,058,151 11/1977 Tonezu .......................... 198/722 X
4,416,202 11/1983 Rooklyn .......................... 104/247 X

FOREIGN PATENT DOCUMENTS 2756422 6/1979 Fed. Rep. of Germany ...... 198/472

Primary Examiner—Jeffrey V. Nase
Attorney, Agent, or Firm—Kurt Kelman

[57] ABSTRACT

A conveyor arrangement useful in an assembly machine for conveying an element in a conveying direction, the element having a guide member arranged thereon and defining a lateral side face, and the conveyor arrangement comprising a track for laterally guiding the element and rollers for advancing the element in the conveying direction associated therewith, the guide track being constituted by the rollers associated with the lateral side face of the element and a lateral guide track for the guide member, the guide track being spaced transversely to the conveying direction from the rollers and extending oppositely thereto in relation to the lateral side face of the element, and the guide member being arranged for guidance along the guide track without play.

10 Claims, 6 Drawing Figures

CONVEYOR ARRANGEMENT

This is a continuation of my copending application Ser. No. 470,917, filed Mar. 1, 1983, now abandoned.

The present invention relates to a conveyor arrangement useful in an assembly machine for conveying an element, such as a workpiece or a pallet for a workpiece, in a conveying direction.

Published German patent application No. 2,756,422 discloses a conveyor arrangement for a modular assembly line for manufacturing structural parts in two or more stages. The modular assembly line comprises a plurality of working and assembly stations forming a linear conveying path. The conveyor arrangement comprises a longitudinally extending guide for the workpieces or pallets and this guide has two lateral guide tracks spaced from each other transversely to the conveying direction and a vertical guide track, the guide tracks cooperating to guide the workpieces or pallets laterally and vertically. Drive elements are associated with the tracks and frictionally engage respective faces of the workpieces or pallets for advancing them in the conveying direction. The drive elements are spaced from each other in this direction so that there is access to the workpieces or pallets from below. While this conveyor arrangement has been successfully used, two spaced lateral tracks and the additional arrangement of drive elements for guiding and advancing the workpieces or pallets involve disadvantages with respect to space requirements and costs.

It is the primary object of this invention to improve a conveyor arrangement of this type by so arranging the guide and advancing means for the workpieces or pallets that costs will be reduced while still assuring exact lateral guidance during the conveyance thereof, with minimal space requirements.

The above and other objects are accomplished according to the invention with a conveyor arrangement for conveying an element in a conveying direction, wherein the element has a guide member arranged thereon and defining a lateral side face. The conveyor arrangement comprises means for laterally guiding the element and means for advancing the element in the conveying direction associated therewith, the guiding means being constituted by the advancing means associated with the lateral side face of the element and a lateral guide track for the guide member, the guide track being spaced transversely to the conveying direction from the advancing means and extending oppositely thereto in relation to the lateral side face of the element, and the guide member being arranged for guidance along the guide track without play. The conveyor arrangement usually also comprises means for vertically guiding the element.

The surprising advantages of such a conveyor arrangement are derived from the fact that it requires only a single lateral guide track while the advancing means assumes the double function of lateral guide. At the same time, since the advancing means is associated with only one lateral side face of the element to be advanced, the lateral guide track and the advancing means may be alternately arranged along one or the other lateral side face of the element, depending on the prevailing space conditions. Furthermore, the tolerance-free guidance of the element by its guide member along the lateral guide track assures its exact centering with respect to the advancing means and any handling and working devices in an unexpectedly simple manner. This facilitates the centering of the workpieces or pallets in each assembly or work station, thus expediting the assembly work, and the costs of the entire assembly line are reduced because no separate centering means is required at these stations. The tolerance-free lateral guidance also avoids sudden lateral accelerations so that parts that are loosely placed on the workpieces or pallets cannot fall off.

The above and other objects, advantages and features of the present invention will become more apparent from the following detailed description of certain now preferred embodiments thereof, taken in conjunction with the accompanying, generally schematic drawing wherein FIG. 1 is a fragmentary top view of a conveyor arrangement in an assembly line for manufacturing a workpiece in one or more stages;

Figure 1:
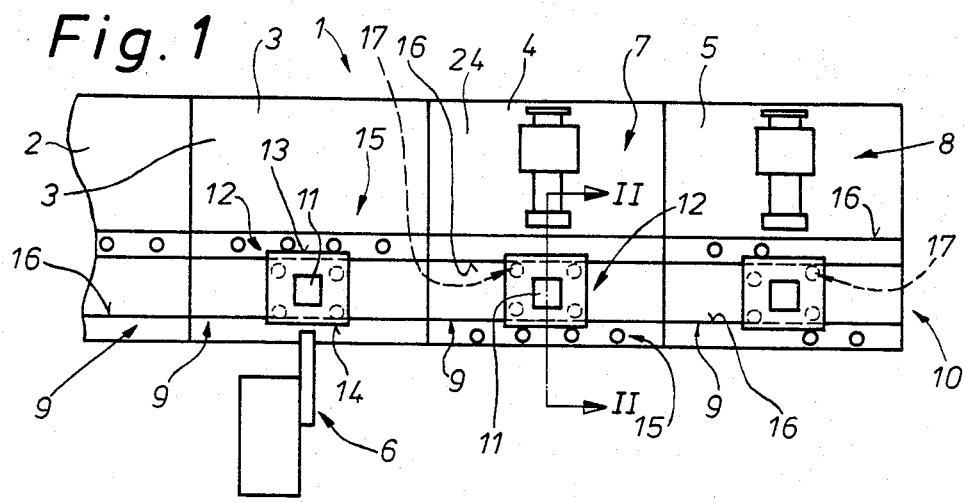

Referring now to the drawing and first to FIG. 1, there is shown assembly line 1 for manufacturing workpieces 11 in several succeeding stages. The drawing shows successive work stations 2 to 5 of this assembly line and each work station may have its own power and control means as well as delivery means 6 for feeding parts to the work station of the assembly line as well as handling and work tools 7, 8. Conveyor arrangement modules 9 constitute the respective work stations and are put together to form conveyor arrangement 10 for pallets 12 carrying workpieces 11. Each pallet has guide member 17 arranged thereon and defines lateral side faces 13, 14 which are opposite each other and, in the illustrated embodiment, mirror-symmetrical. This enables the pallet to be used universally for cooperation with selected arrangements of the advancing means since the advancing means may be arranged for engagement with either side face. Conveyor arrangement 10 comprises means 15, 16 for laterally guiding pallet 12 and means 15 for advancing the pallet in the conveying direction, the guiding means being constituted by advancing means 15 associated with lateral side face 13 of pallet 12 and lateral guide track 16 for guide member 17. Guide track 16 is spaced transversely to the conveying direction from advancing means 15 and extends oppositely thereto in relation to lateral side face 13 of pallet 12. Guide member 17 is arranged for guidance along guide track 16 without play.

Figure 2:
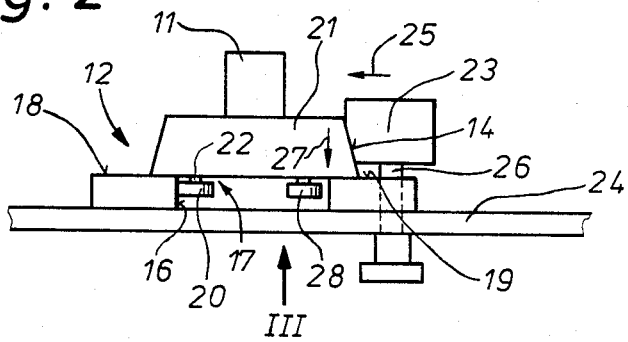
FIG. 2 is a sectional view along line II—II of FIG. 1, showing a pallet and a workpiece carried thereon.
Figure 3:
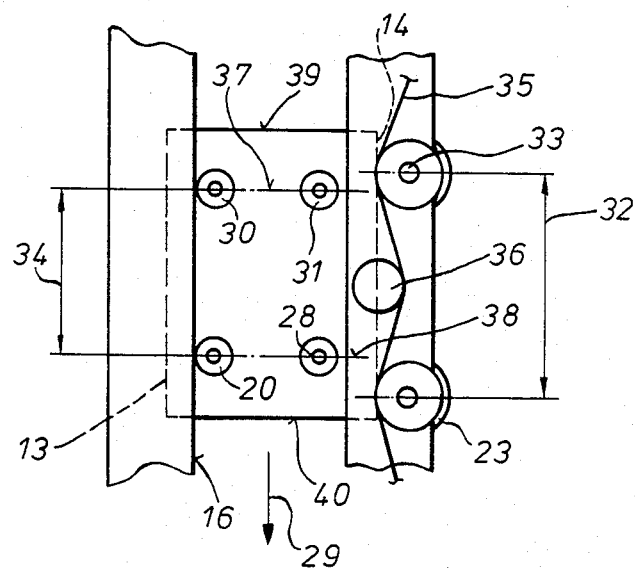
FIG. 3 is a bottom view in the direction of arrow III of FIG. 2.

FIGS. 2 and 3 illustrate pallet 12 and workpiece 11 carried thereby on a larger scale. As shown, the pallet rests on means for vertically guiding the pallet, the illustrated vertical guide means being comprised of two guide tracks 18, 19, a vertically extending side face of vertical guide track 18 constituting lateral guide track 16 for guide member 17 journaled on the underside of pallet 12. The illustrated guide member is comprised of two hardened rollers 20, 30 spaced in the conveying direction and mounted on axle 22 journaled in support plate 21 of pallet 12 and extending perpendicularly thereto. These rollers operate like anti-friction or ball bearings for the pallets and have the advantage of assuring a very accurate guidance and positioning of the pallet with respect to the lateral guide track over a long operating life. The illustrated advancing means 15 comprises elastic conveyor rollers 23, 33 spaced in the conveying direction. Successive conveyor rollers 23, 33 are spaced in the direction of elongation of lateral guide track 16 a distance 32 shorter than the length of pallet 12. Because of the elasticity of the conveyor rollers, the arrangement of advancing means 15 is such as to exert a pressure against lateral side face 13 of pallet 12 in the direction of lateral guide track 16 whereby guide rollers 20, 30 engage the guide track without play. This is accomplished by so arranging conveyor rollers 23, 33 on vertical guide track 19 and support plate 24 of the conveyor arrangement that the distance between the tangent of the elastic surface of conveyor roller 23, 33 and lateral guide track 16 is slightly less than the distance between lateral side face 14 and the lateral guide track. In this manner, the elastic deformation of the conveyor roller, which has been exaggerated in the drawing for the sake of a better illustration, will exert force 25 on pallet 12 in the direction of the lateral guide track. This not only assures the tolerance-free guidance of hardened guide rollers 20, 30 along lateral guide track 16 but also produces increased friction between conveyor rollers 23, 33 and pallet 12 so that substantial drive forces will be transmitted from the conveyor rollers to the pallets without slippage even if the workpieces carried on the pallets are relatively heavy. Furthermore, lateral side face 14 of pallet 12 is inclined over at least a portion thereof. Conveyor rollers 23, 33 are rotatable about respective axes 26 journaled in vertical guide track 19 and support plate 24, and the distance between lateral side face 14 of the pallet and axes 26 of the conveyor rollers increases with the distance from vertical guide track 19. The inclination of lateral side face 14 of pallet 12 causes a component 27 of horizontal pressure force 25 to be converted into a vertical pressure force pressing the pallet against vertical guide tracks 18, 19 and thus assuring a solid support of the pallet on these guide tracks.

As shown in the drawing, additional rollers 28, 31 are associated with lateral side face 14 of the pallet so that they are spaced from the vertical side face of guide track 19. Therefore, the lateral guidance of pallet 12 is effected solely by lateral guide track 16 in engagement with guide rollers 20, 30, in cooperation with conveyor rollers 23, 33. It is, therefore, not necessary to machine the vertical side face of vertical guide track 19 so that it may serve as lateral guide track. Distance 32 between successive conveyor rollers 33, 23 in conveying direction 29 of pallet 12 is larger than distance 34 between the two guide rollers 30, 20 associated with lateral side face 13 and additional rollers 31, 28 associated with lateral side face 14.

A drive chain 35 tensioned by support roller 36 engages conveyor rollers 23,33 to rotate them in the same direction, a separate drive for the advancing means of the conveyor arrangement being provided for each conveyor arrangement module.

Referring to FIG. 3, pallet 12 is shown to have two opposite lateral side faces 13, 14 and like guide members 20, 30 and 28, 31 associated with the opposite lateral side faces and spaced in conveying direction 29. Hardened guide rollers 20, 30 and 28, 31 are arranged in two vertical planes 37, 38 extending perpendicularly to the lateral side faces and spaced in the conveying direction by distance 34. This enables pallet 12 to be guided laterally also along a guide track extending perpendicularly to lateral guide track 16. This only requires engaging one of pallet end faces 39, 40 extending perpendicularly to lateral side faces 13, 14 with conveyor rollers. In this manner, the same guide rollers may be used for laterally guiding the pallet along mutually perpendicular paths.

Since the spacing between successive conveyor rollers 28, 31 is shorter than pallet 12 in conveying direction 29, at least one conveyor roller will always engage the pallet and press it against lateral guide track 16 so that the advance of the pallet will be accurately controlled.

Figure 4:
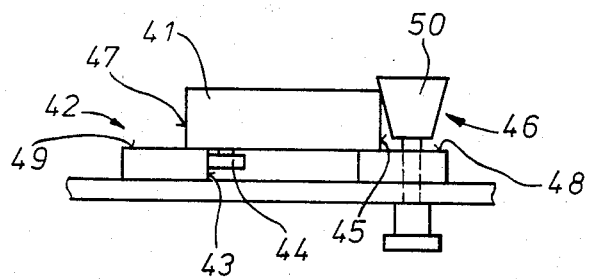
FIG. 4 is a view similar to that of FIG. 2 and illustrating another embodiment.

FIG. 4 shows pallet 41 of conveyor arrangement 42 in an end view, the conveyor arrangement comprising lateral guide track 43 cooperating with guide roller 44 of the pallet. The pallet has two opposite lateral side faces 45, 47, conveyor roller 46 cooperating with lateral side face 45 opposite lateral guide track 43. Two guide tracks 48, 49 in the range of the lateral pallet side faces vertically guide the pallet. The conveyor rollers are frusto-cones 50 and taper frusto-conically towards track 48. This is an alternate arrangement for assuring that guide roller 44 is pressed into tight contact with lateral guide track 43 as well as vertical guide track 48, thus providing a secure guidance of the pallet.

Figure 5:
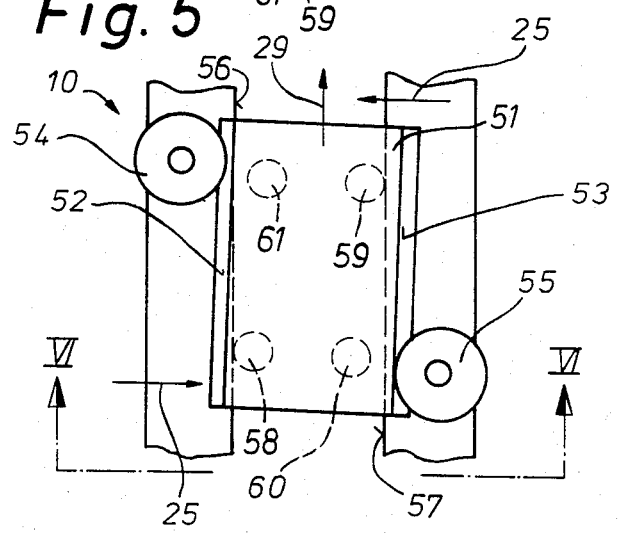
FIG. 5 is a top view of a pallet in a transition range of a conveyor arrangement according to this invention, wherein succeeding advancing means are arranged at opposite lateral side faces of the pallet.

FIG. 5 illustrates pallet 51 of conveyor arrangement 10 in a transition zone between conveyor rollers 54, 55 alternately associated with opposite lateral side faces 52, 53 of the pallet, such as the transition zone between work stations 4 and 5 when the pallet is transferred from the conveyor arrangement section of station 4 to that of station 5. Lateral guide tracks 56, 57 extend in this transition zone in association with the opposite lateral side faces of the pallet. Because of lateral force 25 exerted by conveyor roller 55 on the pallet, guide roller 58 is pressed against lateral guide track 56 while guide roller 59 is engaged with opposite lateral guide track 57 by the pressure of conveyor roller 54. While roller 60 remains spaced from lateral guide track 57 in the range of conveyor roller 55, roller 61 is spaced from lateral guide track 56 because of the smaller distance between rollers 58, 60 and 59, 61 transverse to conveying direction 29. This causes pallet 51 to be slightly skewed in the transition zone (this being shown somewhat exaggeratedly in the drawing for a better understanding) but the transfer from one work station to the other proceeds continuously and smoothly since the pallet rolls slowly along conveyor roller 54 until the lateral pressure of this roller presses guide roller 60 into tolerance-free contact with opposite lateral guide track 57. In the same way, the continuous driving rotation of conveyor roller 54 continuously forces guide roller 59 against lateral guide track 57 while the pallet is advanced in conveying direction 29.

By arranging like guide members in association with two opposite lateral side faces of the element to be conveyed, i.e. the pallet or workpiece, the conveyor and the guide rollers may be alternately engaged with the respective lateral side faces, depending on the available space and the work requirements necessitating access to one or the other side of the workpiece. If the distance between the hardened guide rollers associated with a respective lateral side face of the element is equal to, or larger than, the distance between successive conveyor rollers, no torque will be exerted upon the pallet since there will always be a conveyor roller between two guide rollers.

Figure 6:
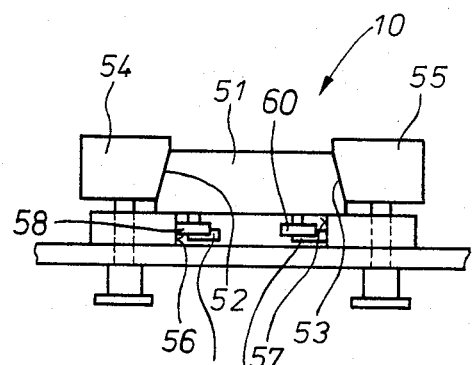
FIG. 6 is an end view along the line VI—VI of FIG. 5.

As shown in FIG. 6, lateral side faces 52, 53 of pallet 51 are partially inclined, i.e. the upper portion of the side faces in contact with conveyor rollers 54, 55 is inwardly inclined. For a better understanding of the positions of guide rollers 58 to 61, rollers 58, 60 are shown vertically offset in relation to rollers 59, 61. This arrangement has the further advantage that grooving in lateral guide tracks 56, 57 is avoided by the engagement of rollers 58 to 61 with these tracks.

As indicated in FIG. 6, in addition to providing inclined lateral side faces for the pallets, the conveyor rollers may be conical or frusto-conical. Furthermore, the guide rollers on the pallets may be made not only of hardened metal but also of highly rigid synthetic resin, such as polyamide. Also, while a drive chain has been shown in FIG. 3 as means for rotating the conveyor rollers, any suitable drive means may be used, such as V-belt transmissions, individual motors for each roller and the like. Preferably, if a drive chain is used, a slip clutch is arranged between the pinions over which the chain is trained and the conveyor rollers in engagement with the lateral side faces of the pallets so that, when the pallet is stopped in a work station, no damage is done to the conveyor rollers or the lateral pallet side faces. It is also possible to arrange the conveyor rollers laterally displaceably or under spring pressure to enable them to exert the required lateral pressure on the pallet in the direction of the lateral guide track.

What is claimed is:

1. A conveyor arrangement useful in an assembly machine for conveying a pallet for a workpiece in a conveying direction, the pallet defining a lateral side face extending in the conveying direction, the conveyor arrangement comprising means for laterally guiding the pallet and means for advancing the pallet in the conveying direction, the guiding means being constituted by the advancing means associated with the lateral side face, at least two guide members fixedly spaced in the conveying direction and positioned opposite the advancing means transversely to the conveying direction and a lateral guide track for the guide members only opposite the advancing means, the advancing means comprising at least two conveyor rollers spaced in the conveying direction, successive ones of the conveyor rollers being spaced a distance shorter than the length of the pallet in said direction, each one of the conveyor rollers being arranged transversely substantially opposite a respective one of the guide members and none of the conveyor rollers being transversely opposite another one of the conveyor rollers, each conveyor roller and the opposite lateral guide track defining a transverse space therebetween permitting the respective guide member to move transversely with respect to the opposite lateral guide track, and the conveyor rollers being arranged to engage the lateral side face of the pallet frictionally and to exert an elastic pressure force against the lateral side face of the pallet in the direction of the opposite lateral guide track, the elastic pressure force having a vertical component pressing the pallet down and being sufficient to press the respective guide member opposite each conveyor roller into engagement with the opposite lateral guide track without play for guidance of the pallet therealong.

2. The conveyor arrangement of claim 1, further comprising means for vertically guiding the pallet.

3. The conveyor arrangement of claim 1, wherein the pallet has two opposite ones of the lateral side faces and like ones of the guide members are associated with the opposite lateral side faces.

4. The conveyor arrangement of claim 3, wherein each guide member is comprised of a hardened roller.

5. The conveyor arrangement of claim 4, wherein the rollers are arranged in two vertical planes extending perpendicularly to the lateral side faces and spaced in the conveying direction.

6. The conveyor arrangement of claim 1, wherein the conveyor rollers are elastic.

7. The conveyor arrangement of claim 1, wherein the pallet defines two opposite ones of the lateral side faces, the opposite side faces being mirror-symmetrical.

8. The conveyor arrangement of claim 7, wherein the successive conveyor rollers and the lateral guide track are alternately associated with a respective one of the lateral side faces.

9. A conveyor arrangement useful in an assembly machine for conveying a pallet for a workpiece in a conveying direction, the pallet defining a lateral side face extending in the conveying direction, the conveyor arrangement comprising a track for vertically guiding the pallet, means for laterally guiding the pallet and means for advancing the pallet in the conveying direction, the guiding means being constituted by the advancing means associated with the lateral side face, at least two guide members fixedly spaced in the conveying direction and positioned opposite the advancing means transversely to the conveying direction and a lateral guide track for the guide members only opposite the advancing means, the advancing means comprising at least two conveyor rollers associated with the lateral side face of the pallet and tapering frusto-conically towards the track for vertically guiding the pallet, successive ones of the conveyor rollers being spaced a distance shorter than the length of the pallet in said direction, each one of the conveyor rollers being arranged transversely substantially opposite a respective one of the guide members and none of the conveyor rollers being transversely opposite another one of the conveyor rollers, each conveyor roller and the opposite lateral guide track defining a transverse space therebetween permitting the respective guide member to move transversely with respect to the opposite lateral guide track, and the conveyor rollers being arranged to engage the lateral side face of the pallet frictionally and to exert an elastic pressure force against the lateral side face of the pallet in the direction of the opposite lateral guide track, the elastic pressure force having a vertical component pressing the pallet down and being sufficient to press the respective guide member opposite each conveyor roller into engagement with the opposite lateral guide track without play for guidance of the pallet therealong.

10. A conveyor arrangement useful in an assembly machine for conveying a pallet for a workpiece in a conveying direction, the pallet defining a lateral side face inclined over at least a portion thereof and extending in the conveying direction, the conveyor arrangement comprising a track for vertically guiding the pallet, means for laterally guiding the pallet and means for advancing the pallet in the conveying direction, the guiding means being constituted by the advancing means associated with the lateral side face, at least two guide members fixedly spaced in the conveying direction and positioned opposite the advancing means transversely to the conveying direction and a lateral guide track for the guide members only opposite the advancing means, the advancing means comprising at least two conveyor rollers associated with the lateral side face of the pallet and rotatable about respective axes, the distance between the inclined lateral side face of the pallet and the axes of the conveyor rollers increasing with the distance from the vertical guide track, successive ones of the conveyor rollers being spaced a distance shorter than the length of the pallet in said direction, each one of the conveyor rollers being arranged transversely substantially opposite a respective one of the guide members and none of the conveyor rollers being transversely opposite another one of the conveyor rollers, each conveyor roller and the opposite lateral guide track defining a transverse space therebetween permitting the respective guide member to move transversely with respect to the opposite lateral guide track, the conveyor rollers being arranged to engage the inclined lateral side face frictionally and to exert an elastic pressure force against the inclined lateral side face of the pallet in the direction of the opposite lateral guide track, the elastic pressure force having a vertical component pressing the pallet down and being sufficient to press the respective guide member opposite each conveyor roller into engagement with the opposite lateral guide track without play for guidance of the pallet therealong.

* * * * *